United States Patent [19]

Norman

[11] Patent Number: 5,585,194
[45] Date of Patent: Dec. 17, 1996

[54] EXTENDED FLEX LIFE CORE AND OVERLAY COMPOSITION AND LAMINATES THEREOF

[75] Inventor: Donald E. Norman, Newcomerstown, Ohio

[73] Assignee: Empire Plastics, Inc., Vestal, N.Y.

[21] Appl. No.: 375,443

[22] Filed: Jan. 19, 1995

[51] Int. Cl.$^6$ .......................... B32D 27/30; B42D 15/10
[52] U.S. Cl. .......................... 428/520; 428/421; 428/422; 428/483; 428/522; 525/190; 525/222; 525/227; 525/228; 525/239
[58] Field of Search ...................... 525/190, 222, 525/227, 228, 239; 428/421, 422, 483, 520, 522

[56] References Cited

U.S. PATENT DOCUMENTS

| | | | |
|---|---|---|---|
| 4,100,325 | 7/1978 | Summers | 428/520 |
| 4,123,585 | 10/1978 | Sparzak | 428/379 |
| 4,133,926 | 1/1979 | Vorrier et al. | 428/200 |
| 4,329,278 | 5/1982 | Reardon | 525/190 |

FOREIGN PATENT DOCUMENTS

| | | | |
|---|---|---|---|
| 6978 | 7/1962 | Japan | 525/239 |
| 168646 | 10/1983 | Japan . | |
| 249850 | 10/1989 | Japan . | |

Primary Examiner—David Buttner
Attorney, Agent, or Firm—Hudak & Shunk Co., L.P.A.

[57] ABSTRACT

Extended flexible life laminates such as credit cards have at least one core layer and generally on each side thereof at least one overlayer. The core layer composition comprises polyvinyl chloride, a copolymer derived from vinyl chloride and vinyl ester monomers, at least one acrylic resin polymer, as well as a copolymer derived from ethylene and vinyl acetate monomers. Desirably, at least one side of the core layer is corona treated in order to improve ink adhesion thereto. The overlay composition is similar but generally is transparent. After the core layer and the overlayers are laminated together, the credit card can be embossed with pertinent information such as name, expiration date, credit card number, and the like. The laminated credit card can optionally but desirably contain a magnetic strip on the overlayer or a microchip therein. The laminates of the present invention generally have increased flex life, improved ultra violet light resistance, and low melting points.

14 Claims, 1 Drawing Sheet

EXTENDED FLEX LIFE CORE AND OVERLAY COMPOSITION AND LAMINATES THEREOF

FIELD OF THE INVENTION

The present invention relates to polymeric core and overlay compositions which have good processing properties as well as a low melting point temperature. The present invention also relates to laminates made from the core and overlay material which have extended flex life, good ultraviolet (U.V.) light resistance, and are useful as credit cards.

BACKGROUND

Plastic sheet laminates are commonly used in a variety of applications including identification cards, credit cards, bank cards, and the like. Such laminates are generally comprised of a relatively thick core layer containing printed indicia on at least one side thereof, and a relatively thin, transparent layer laminately joined to each side of the core layer. For certain applications, particularly for credit cards, the laminate is embossed and the raised areas are typically printed or tipped with ink.

Heretofore, such laminates have been generally made of plastic sheets comprised of various thermoplastic blends containing primarily polyvinyl chloride homopolymers or copolymers. Previous credit card laminates have properties such as stiffness, impact strength, resilience and flexural durability only sufficient to provide about a one to two-year service life.

SUMMARY OF THE INVENTION

The present invention relates to polymeric core blends which are readily processed into ink-receptive sheets or layers and to similar blends of polymeric overlay sheets or layers which have good contact clarity when laminated to the core sheets.

The core layer of the present invention is a thermoplastic polymeric blend comprising a polyvinyl chloride, a copolymer derived from vinyl chloride and vinyl ester monomers such as vinyl acetate, one or more acrylic resin polymers or copolymers such as those derived from acrylate and optionally conjugated diene and vinyl substituted aromatic monomers, a copolymer derived from ethylene and vinyl acetate monomers and optionally carbon monoxide monomers, desirably solid tin stabilizers, various ester waxes, and the like. The above components when blended in appropriate amounts, along with various conventional additives are readily processed into polymeric sheets having good impact resistance, good U.V. resistance and an unexpected increase in flex life. In lieu of the vinyl chloride-vinyl ester copolymer, a high intrinsic viscosity (I.V.) polyvinyl chloride homopolymer can be utilized.

Another somewhat similar polymeric blend is utilized as an outer layer or an overlay in combination with the core layer to form a laminate. The outer layer blend is generally similar to the core layer except that it is substantially transparent and desirably contains liquid tin stabilizers and has a lower melting point. Alternatively, the outer layer can be formed from various thermoplastics such as polyester polymers, polyvinyl chloride polymers, copolymers derived from vinyl chloride and vinyl acetate monomers, as well as from various fluoride polymers.

DETAILED DESCRIPTION OF PREFERRED EMBODIMENTS

Figure 1:
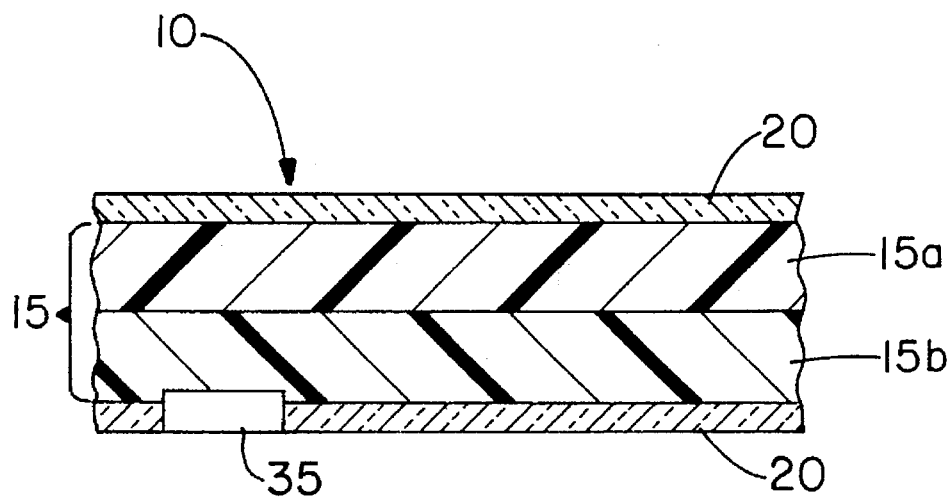
FIG. 1 is a cross-section view of a laminate of the present invention.
Figure 2:
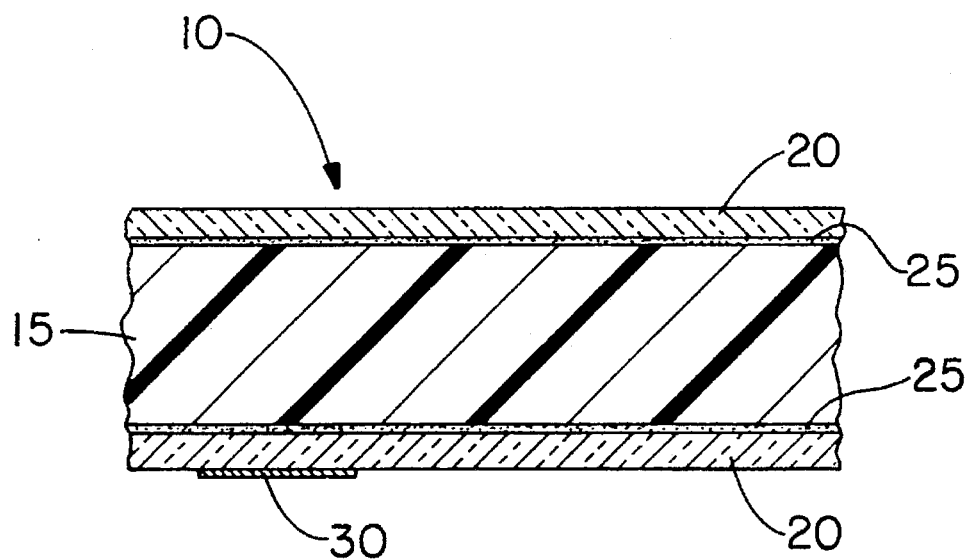
FIG. 2 is a cross-sectional view of another laminate of the present invention wherein the overlay layers are adhered to the core layer.

The thermoplastic core blend 15 of the present invention is generally laminated with at least one thermoplastic overlayer 20, which can be a single polymer or a blend of polymers. The laminate 10 generally exists in sheet form as shown in FIGS. 1 and 2. The thickness of the core layer is usually large relative to the thickness of the overlay layer or sheet.

Core layer 15 generally has good adhesion to indicia thereon, such as ink, dye, and the like. Accordingly, the laminates of the present invention are suited for any type of card such as printed identification cards, e.g., driver's license cards, security cards, library cards, immigration cards, and the like, or desirably monetary identification cards such as credit cards, bank cards, bus cards, telephone cards, health care cards, and the like.

Although the thickness of the core can vary widely, when utilized in a laminate as a monetary card or identification card, the total thickness is desirably from about 5 to about 40 or 50 mils and preferably from about 10 to about 35 mils. The core can be a single layer as shown in FIG. 2, or a plurality of thin layers such as layers 15a and 15b, which are laminated together as shown in FIG. 1.

The core layer 15 is optionally but preferably provided with a surface treatment, e.g., chemical or abrasive, to reduce surface tension and thereby improve wetability with various inks or dyes which are subsequently applied to the treated surfaces of the core layer by any conventional printing method such as gravure, offset flexography, screen printing, jet printing, web printing and the like. A preferred method of treatment to improve such receptivity, is by corona discharge wherein at least a portion of the outer surfaces of core layer 15 is oxidized to a depth, for example, of up to about 20 Å, and preferably from 1 to about 10 Å. The surface treatment is preferably sufficient to provide a surface tension of about 20 to about 75, and preferably from about 40 to about 72 dynes per square centimeter.

After the outer surfaces of core layer 15 are treated and subsequently printed with desired indicia, protective outer layers 20 are laminated to each side of the core layer to prevent the ink from wearing away during normal handling of the finished laminate card. Outer layers 20 are composed of a polymer or a polymeric blend which exhibits good contact clarity, i.e., is substantially transparent. By the term substantially transparent, it is meant that generally at least 80 percent, desirably at least 90 percent, and preferably at least 95 percent of the light incident upon an outer layer of a thickness of approximately 3 mils is transmitted therethrough. In other words, the outer layer does not significantly distort the appearance of the printed indicia on a core layer. Each outer layer 20 can be a single layer as shown in FIGS. 1 and 2 or a plurality of layers.

Because outer layers 20 are primarily provided to prevent the ink on printed core layer 15 from wearing away, preferably the outer layers are relatively thin. While the thickness of the outer layer is not critical, to minimize optical distortion and to minimize the overall thickness of the laminate while providing adequate protection for the printed matter on the core layer, the outer layer typically has a total thickness of from about 0.5 mils to about 5 mils, and preferably from about 1 to about 3 mils.

Outer layers 20 can be affixed to the core layer by thermally fusing the layers together (FIG. 1), or a very thin layer of a suitable conventional transparent adhesive 25 can be used to bond each of outer layers 20 to the external sides of core layer 15 (FIG. 2). Thermal fusion is generally preferred when small amounts of ink are used, whereas adhesives are generally desired when large amounts of ink are applied to the surface of the core. Obviously, for certain applications of the invention, it may be desirable to provide printed indicia on only one side of the card. In this case, it would only be necessary to treat and print on one side of core or base layer 15 and to laminately affix only a single protective outer layer 20 to the printed side of the card.

In a preferred embodiment, core layer 15 is comprised of a polymeric blend including a polyvinyl chloride resin; a copolymer made or derived from vinyl chloride and vinyl ester monomers; one or more acrylic resin polymers or copolymers; a copolymer made or derived from ethylene and vinyl acetate monomers; various heat stabilizers with solid tin stabilizers being preferred, various ester waxes, and a tertiary organo phosphite. The above polymers can generally be utilized in a wide range of molecular weights and are readily available from various manufacturers. Similarly, various conventionally available solid tin stabilizers, ester waxes, etc. can also be utilized.

The polyvinyl chloride resin is preferably a homopolymer of vinyl chloride monomer or optionally a copolymer thereof containing substantially repeat units derived from vinyl chloride, e.g., at least 70%, 80%, or 90% and up to 10, 20, or 30 percent of halogen containing repeat units as derived from vinylidene chloride, 1,2-dichloroethylene, and the like. Suitable polyvinyl chloride resins are commercially available from The Geon Company under the trademark "GEON", such as GEON® 334 or from Georgia Gulf Corp. under the product name PVC 1066. Such polyvinyl chloride resins generally have an intrinsic viscosity (I.V.) of from about 0.50 to about 0.79 and desirably from about 0.60 to about 0.73 at 30° C. in cyclohexanone.

The copolymer of vinyl chloride and vinyl ester is generally any copolymer made or derived from vinyl chloride and vinyl ester monomers. The ester groups of the copolymer introduce polarity to the polymeric blend thereby improving printability and adhesion. Suitable vinyl ester monomers include those wherein the ester group is saturated and contains from 2 to about 6 carbon atoms, such as vinyl acetate (preferred), vinyl propionate, vinyl butyrate, and vinyl valerate. The ratio of repeat units derived from vinyl chloride as to those derived from vinyl ester has a significant effect on the printability of the polymeric blend of the invention. The amount by weight derived from vinyl ester in the copolymer is generally from about 5 to about 20 percent, desirably from about 7 to about 15 percent, and preferably from about 8 to about 12 percent by weight. A suitable vinyl chloride/vinyl acetate copolymer is commercially available from Occidental Chemical such as Oxy 1710 as well as from Borden Chemical and Plastics as "VC 168".

The one or more acrylic resin polymers can be a homopolymer or copolymer, or physical blends thereof. Examples of homopolymers include those of acrylic acid, methacrylic acid, acrylonitrile, methacrylonitrile, and the like. Acrylate homopolymers or copolymers are made from one or more alkyl (meth) acrylate wherein the alkyl group has from 1 to 8 carbon atoms. Examples of suitable homopolymers include polyethyl acrylate, polypropyl acrylate, polybutyl acrylate, polymethyl methacrylate, and the like. A suitable homopolymer acrylate is polyethyl acrylate commercially available as EVA441 from DuPont. A desired acrylate copolymer is made from butylacrylate and methyl methacrylate monomers is commercially available as KM-334 from Rohm & Haas Corporation. Another suitable acrylate copolymer is K130 made by Rohm & Haas Corporation which is similar to KM-334 in that it is made from two or more acrylate monomers. When copolymers are utilized, the amount by weight of at least one of the repeat units is from 10% to 90% and desirably from 30% to 70% with the remaining one or more different repeat units being the difference.

Optionally but desirably, the copolymers can include amounts of from about 0.1 up to 30 or 50 or even 70 percent of repeat units derived from at least one conjugated diene monomer having from 4 to 10 carbon atoms, for example, butadiene, isoprene, etc., and/or up to the same amount of at least one vinyl substituted aromatic monomers having from 8 to 15 carbon atoms such as styrene, etc., with specific examples being ABS (acrylonitrile-butadiene-styrene) copolymer or MBS (methyl methacrylate-butadiene-styrene) copolymer. The amount of the acrylic resin monomer is the difference. The total amount of monomers adds up to 100 percent. A desirable MBS type acrylate copolymer is BTA702 from Rohm and Haas Company, whereas a desirable ABS type copolymer is Blendex 338 from G. E. Plastics.

The one or more acrylic resin polymers are highly desired in the present invention inasmuch as they impart good ultraviolet light stability to the sheet or layer, good impact resistance, as well as improved hinge life or flexible durability.

An important aspect of the present invention is to utilize a copolymer of ethylene, vinyl ester, and optionally carbon monoxide. This copolymer has a low melting point of generally from about 100° (38° C.) to about 200° F. (93° C.), desirably from about 110° (43° C.) to about 160° F. (71° C.), and preferably from about 120° (49° C.) to about 140° F. (60° C.). The vinyl ester monomers generally contain from 2 to 6 carbon atoms in the ester group. Vinyl esters are preferred. The low melting point copolymer which preferably contains carbon monoxide can be made from other monomers in lieu of the preferred vinyl ester monomers such as unsaturated mono- or dicarboxylic acids of from 2 to 20 carbon atoms, esters of said unsaturated mono- or dicarboxylic acids, vinyl alkyl ethers wherein the alkyl group has from 1 to 18 carbons, acrylonitrile, methacrylonitrile, norbornene, alpha olefins of from 3 to 12 carbon atoms, or vinyl substituted aromatic compounds having a total of from 8 to 12 carbon atoms. These non-vinyl ester monomers can also be utilized in combination with the ethylene, carbon monoxide, and vinyl ester monomers generally in small amounts, that is, less than 20 or 10 percent by weight, and preferably are not utilized at all. Optionally, copolymers made from such non-vinyl ester monomers and ethylene and carbon monoxide can be utilized in small amounts of generally less than 30, desirably less than 15, and preferably 5 percent or nil in association with the low melting point copolymers of ethylene, vinyl ester and carbon monoxide. The amount of the low melting point copolymers is generally from about 5 to about 30 or 50 parts and desirably from about 7 to about 18 parts by weight for every 100 parts by weight of said PVC polymer. The weight average molecular weight of the low melting point copolymer is generally from about 80,000 to about 160,000, and preferably from about 100,000 to about 140,000. The copolymers of ethylene, vinyl ester or a non-vinyl ester monomer, and carbon monoxide generally contain from about 3 to about 20 or 30 percent and desirably from about 6 to about 9 percent by weight of carbon monoxide therein. The vinyl ester or other monomer content is generally from about 5 to about 60 percent, desirably from about 10 to about 45 percent and preferably from about 20 to about 28 percent by weight. The amount of ethylene is the remaining percent which adds up to 100 percent. The low melting point copolymer imparts increased flex life to the core composition, better ultra violet light resistance, and improved processability. A suitable poly(ethylene-vinyl acetate) copolymer is ELVALOY® 4924 from Du Pont. The low melting point copolymer is more fully described in U.S. Pat. No. 3,780,140, which is hereby fully incorporated by reference.

The one or more core layers of the present invention are desirably free of high melting point polymeric components having melting points generally in excess of about 340° F. (171° C.), or more preferably in excess of 375° F. (190° C.) such as chlorinated polyethylene since high processing temperatures are required to melt the same which can degrade the other polymer components and/or the ink or dyes. By the term "substantially free of" it is meant that the core blend contains less than 5 parts, desirably less than 3, preferably less than 1, and optimally nil or no parts by weight per every 100 parts by weight of polyvinyl chloride polymer.

Core layer 15 generally comprises a blend of a polyvinyl chloride resin, from about 50 to about 200, and preferably from about 75 to about 125 parts by weight of the vinyl chloride-vinyl ester copolymer per 100 parts by weight of the polyvinyl chloride resin; and from about 10 to about 80, desirably from about 12 to about 60, and preferably from about 15 to about 40 parts by weight of the one or more acrylic resin polymers and/or copolymers per 100 parts by weight of the polyvinyl chloride resin.

An important aspect of the present invention relates to the utilization of solid heat stabilizers, as opposed to liquid stabilizers which tend to degrade printability. Solid tin stabilizers have been found to give good ink adhesion. Alkyl-tin mercaptan carboxylates are preferred. Desirably, the alkyl group contains from 1 to 10 carbon atoms with butyl being preferred. Examples of specific tin stabilizers include butyltin mercaptide carboxylate and butyltin mercaptocarboxylate available as PROSPER® M-36, manufactured by Bäerlocher Corporation and as Mark 2255, manufactured by Witco Corporation, respectively. The total amount of such tin stabilizers is generally from about 0.5 to about 10, desirably from about 2.5 to about 7.5, and preferably from about 3 to about 6 parts by weight based upon 100 parts by weight of the polyvinyl chloride polymer.

Another aspect of the present invention is that the core recipe contains at least one lubricant which is generally an ester wax and the same is well known to the art and to the literature. Suitable ester waxes include the glycerol type, the polymeric complex esters, the oxidized polyethylene type ester waxes, and the like, or combinations thereof. Metallic stearates such as barium, calcium, magnesium, zinc and aluminum stearate can also be used. A commercially available ester wax which can be utilized is a blend of mixed glycerol esters such as Loxiol 7111 produced by Henkel Corporation. Another suitable ester wax lubricant is a polymeric complex ester of a saturated fatty acid such as Loxiol G70, also produce by Henkel. Another type of lubricant ester wax is an oxidized polyethylene such as AC 629 A produced by Allied Signal.

It has been found that waxes are important to the present invention because if they are not utilized, a suitable, printable surface is generally not obtained. A plurality of waxes is typically utilized and the total amount thereof is generally from about 0.5 to about 10 parts by weight, desirably from about 0.75 to about 7 parts by weight, and preferably from about 1.0 to about 5 parts by weight per 100 parts by weight of the polyvinyl chloride.

Various organophosphites are also utilized in the core layer to improve the ink adhesion thereof as well to improve color stability. The organophosphites are generally alkyl phenols wherein the alkyl group has from 1 to 10 carbon atoms. The organophosphites can either be liquid or solid and are generally utilized in amounts of from about 0.25 to about 2.0 and desirably from about 0.5 to about 2.0 parts by weight per 100 parts by weight of the polyvinyl chloride. Suitable organic phosphites include tertiary organo phosphites such as MARK C® manufactured by Witco Corporation, and THERMCHEK® 904 manufactured by Ferro Corporation.

The polymeric blend used for core layer 15 generally can contain conventional amounts of conventional additives such as processing aids, antidegradants, pigments, colorants, UV stabilizers, and the like.

Desirably, the pigments exclude flake type materials such as mica, as well as metal flakes such as aluminum or brass inasmuch as they have been found to drastically reduce the flex life of a core layer. Such pigments generally impart a pearlesence or silver or gold shade to the core. The core layer is thus substantially free of flake type compounds, that is, it generally contains less than 4 or 5 percent, desirably less than 2 percent, and preferably nil, that is 0 percent by weight, based upon the total weight of the core.

Similarly, inks or dyes containing such flake type pigments (i.e., metal, mica, etc.) are avoided since they also reduce the flex life of the core and/or the laminate. Thus, inks or dyes are substantially free of flake type compounds, that is, contain less than 40 percent, desirably less than 20 percent, and preferably less than 5 percent or nil (0 percent) by wt., based upon the total weight of the ink or dye.

An alternative core blend layer can be utilized which generally contains the above-noted types of components including the above noted or first polyvinyl chloride and similar amounts of the components with generally the following exceptions. In lieu of the copolymer made from vinyl chloride and vinyl ester monomers, a polyvinyl chloride homopolymer, i.e., a second polyvinyl chloride homopolymer, is utilized which generally has a higher intrinsic viscosity than the first polyvinyl chloride. The intrinsic viscosity is measured in cyclohexanone at 30° C. The second or higher I.V. polyvinyl chloride is generally a magnitude of at least 0.10, desirably greater than 0.12, and preferably from about 0.15 to about 0.40 greater than the first polyvinyl chloride resin. The second polyvinyl chloride thus generally has an I.V. of from about 0.80 to about 1.05 and preferably from about 0.85 to about 1.0. Such higher intrinsic viscosities are desirable inasmuch as it imparts higher heat distortion properties to the core. This alternative core blend formulation containing both a so called "Normal" I.V. polyvinyl chloride as well as a high I.V. polyvinyl chloride homopolymer can be utilized as a substitute for the above noted core blend formulation containing only one polyvinyl chloride homopolymer but preferably is utilized as a core layer for credit card laminates containing microchips therein. An example of such a high I.V. polyvinyl chloride homopolymer is GEON 426 from the BFGoodrich Company as well as 1092 from Georgia Gulf Corporation.

The amount of the second or high I.V. polyvinyl chloride homopolymer is from about 10 to about 125, and preferably from about 30 to about 70 parts by weight for every 100 parts by weight of said "Normal" I.V. polyvinyl chloride homopolymer. In the alternative polymeric core blend the amount of the acrylic copolymer is larger, such as from about 2 to about 15, and desirably from about 4 to about 10 parts by weight for every 100 parts by weight of said "Normal" I.V. polyvinyl chloride homopolymer. Alumina trihydrate is desirably utilized as a processing aid and filler in amounts of from about 1 to 50, and desirably from about 2 to about 10 per 100 parts by weight of the "Normal" I.V. polyvinyl chloride.

The thermoplastic core material of the present invention not only has good ink receptivity, but also good flexural durability, that is, extended flex life. The core materials of the present invention generally have a flex life of from about at least 8,000 or 9,000 flexes, desirably at least 10,000 flexes and preferably at least 15,000 and even 20,000 or 25,000 flexes in the machine direction and generally is from about 8,000 to about 30,000 flexes. In comparison, a typical prior art polyvinyl chloride core recipe as set forth in comparative core recipe A only has a flex life in the machine direction of from about 4,000 to about 6,000 flexes.

COMPARATIVE CORE RECIPE A

| Trade Names | CAS # | Common Name | Recipe A |
|---|---|---|---|
| Geon 110X334 | 9002-86-2 | Poly(Vinyl Chloride) Homopolymer | 100.00 |
| Oxychem 1710 | 9003-22-9 | PVC Suspension Copolymer Resin | 50.00 |
| White Lead | 1319-46-6 | Lead Carbonate Hydroxide | 6.50 |
|  | 56189-09-4 | Dibasic Lead Stearate |  |
| Calcium Stear. | 1592-23-0 | Ca(C18H25O2)2 | .50 |
| MARK C/904 | — | Tertiary Organo Phosphite | .50 |
| BTA-753 | 25053-09-2 | p[BD/MMA/STY] | 21.00 |

The one or more clear or transparent outer layers 20 generally must be free of pigments, dyes, colorants, and the like so that, as noted above, it is transparent. Such outer layers can be formed from a polymer blend which is similar to the core blend and has good compatibility therewith. Alternatively, the transparent outer layer can be a homopolymer or copolymer such as a polyvinyl chloride polymer as described hereinabove, a copolymer of vinyl chloride and a vinyl ester, e.g., vinyl chloride-vinyl acetate, as described hereinabove, a polyester such as that formed by the condensation reaction of a diol containing from 1 to about 10 carbon atoms with a dicarboxylic acid containing from 3 to about 12 carbon atoms with polyethylene terephthalate being preferred, or a fluorine containing polymer such as polyvinyl fluoride, polyvinyl difluoride, polyvinylidene fluoride, and the like. The use of fluoride polymers are highly desirable as the outer layer inasmuch as they have been found to improve the flex life or flexible durability, i.e., flexes to failure. Typically, the flex life of the overlay layer of a fluoride-containing polymer such as polyvinyl fluoride, (PVF) e.g., TEDLAR® manufactured by E. I. DuPont and Co. for a 1 to 2 mill thickness, has a flex life of generally at least 15,000, desirably at least 30,000, and preferably at least 50,000 to about 100,000 flexes based upon the average of the machine direction. These values are unexpectedly much greater than the average flex life value of a conventional heretofore utilized overlay material "REG."

If a multicomponent polymeric blend is utilized for the outer layer sheet or layer, the components thereof are generally similar to those components of the core layers as set forth hereinabove. In a preferred embodiment, the overlayer comprises the polymeric blend of a polyvinyl chloride resin, a copolymer derived from vinyl chloride and vinyl ester monomers, one or more acrylic resin polymers or copolymers, a copolymer derived from ethylene, vinyl ester or other monomers as set forth hereinabove and optional carbon monoxide monomers, heat stabilizers which yield good clarity and thus liquid tin stabilizers are preferred, various ester waxes, a tertiary organo phosphite, and a U.V. stabilizing agent, and the like. The compounds which are common with those utilized in the core layer have been described as set forth hereinabove and thus are not repeated but rather fully incorporated by reference. With respect to the acrylic resin polymers utilized, generally a homopolymer of an acrylate, for example, ethyl acrylate is blended with an acrylic polymer which is generally a copolymer of two alkyl acrylates. Generally, any liquid tin stabilizer can be utilized, such as the various alkyl tin compounds, e.g. dibutyl tin mercaptans, wherein the alkyl portion has from 1 to 8 carbon atoms such as methyl or butyl, with dibutyltin bis(2-ethylhexylmercaptoacetate) being preferred which is available as T-31/PA1076 from Elf-Atochem Corporation. Dibutyltin bis(2-ethylhexylthioglycolate) bis(2-ethylhexylmercaptoacetate) $C_{28}H_{50}O_4S_2Sn$ can also be utilized and is available from Ackros as T4905.

Generally, any conventional ultra-violet light (U.V.) stabilizer known to the art can be utilized such as Mark 1413, and a CAS compound having a number of 1843-05-06 with a preferred stabilizer being 2-(2'-hydroxy-3,5'di-ter-amylphenyl) benzotriazole, which is available as TINUVIN 328 from Ciba-Geigy Corporation.

The amounts of the various components of the overlay polymeric blend are generally different than that of the core layer primary because of contact clarity. Thus, the amount of the copolymer made from vinyl chloride and vinyl ester monomers is generally from about 10 to about 250 and desirably from about 15 to about 200 per 100 parts by weight of the PVC polymer. The amount of the one or more acrylic resin polymers, copolymers, or blends thereof is generally a small amount, as from about 0.5 to about 20 and desirably from about 1.0 to about 10 per 100 parts by weight of the PVC polymer. The amount of the poly(ethylene-vinyl acetate-carbon monoxide) is generally about 5 to about 40 and desirably from about 15 to about 30 per 100 parts by weight of the PVC polymer. The total amount of the one or more lubricants such as the various ester waxes is generally about 0.5 to about 5 and desirably from about 1.0 to about 3 per 100 parts by weight of the PVC polymer. The amount of the liquid tin stabilizers is generally about 0.5 to about 12 and desirably from about 4 to about 10 per 100 parts by weight of the PVC polymer. The amount of the one or more U. V. stabilizers can vary widely depending upon the expected exposure of the card and generally is from about 0.1 to about 2.0 and desirably from about 0.2 to about 1.0 parts per 100 parts by weight of the polyvinyl chloride component.

As with the core layer, in addition to the above components, various other conventional additives in conventional amounts can be utilized in the overlay such as various antiblocking agents, optical brighteners, and the like. The VICAT softening temperature (ASTM D1525-91) of the overlayer is generally lower than that of the core layer.

The above-described polymeric overlay blends of the present invention also have improved average flex life, especially in comparison with heretofore utilized overlay materials as more fully described hereinbelow. Thus, the overlay polymeric blend per se of the present invention has an average flex life in the machine direction of at least 8,000 or 9,000 flexes, desirably at least 10,000 or 15,000 flexes, and preferably at least 20,000, and generally from about 8,000 to about 25,000 flexes until break.

Each of the blends (i.e, for the core layer and the outer layers) is prepared by mixing the disclosed compounds in suitable amounts using any of various known methods and apparatus, and then formed into rolls or cut into sheets. In accordance with a preferred aspect of the invention, both surfaces of the core layer are preferably corona treated as noted hereinabove to improve printability and to improve adhesion with dyes or inks. Moreover, the interior surface of the outer layer sheet(s) is desirably also corona treated.

Prior to lamination, the core sheets are printed on one or both sides with the desired ink and/or dye on at least a portion thereof. Thereafter, an outer layer sheet is laminated to each printed side of the core layer 15 by pressing the layers together under the application of heat with or without adhesive between the layers. If the one or more outer layers 20 are adhered to the core layer, a transparent adhesive such as a heat activated acrylic based resin is used, e.g., WAYTEK WT 552.

During the lamination process, physical indicia such as magnetic strips, code bars, pictures, microchips, computer printed pictures, and other information, can also be simultaneously laminated with or without adhesives to the core sheets (not shown). Desirably, a magnetic strip 30 is adhered to the surface of the outer layer. The laminate generally contains a core layer having a PVC homopolymer and copolymer, that is, vinyl chloride-vinyl ester resin therein. When a computer chip 35 is utilized, a portion of the outer layer of substantially the same size and thickness and shape is removed, and a microchip adhered to the laminate. Generally the thickness of the computer chip extends through overlayer 20 and often partially into the core layer. Thus, when a microchip is utilized, the core blend generally contains two PVC homopolymers with one having a higher I.V. as noted hereinabove.

The compositions of the core 15 and outer layer(s), after being suitably calendered or extruded into sheets of the desired thickness and after application of inks, dyes, or other printing agent, can be laminated together at relatively low temperatures, for example, from about 270° F. (132° C.) to 320° F. (160° C.), and desirably from about 285° F. (140° C.) to about 310° F. (154° C.) to produce an extended life credit card having superior flexural durability.

The sheets can then be cut into individual cards, embossed with a name, account number or other desired information. The raised surfaces of the embossed information can be tipped with ink if desired.

The core and overlay sheets of the present invention are readily processed and have generally low melting temperatures such that when laminated, the ink or various components thereof are not degraded. The laminates have very good flex life, good impact resistance, as well as good UV resistance, and thus are ideally suited for identification cards or monetary cards such as credit cards and the like.

A better understanding of the invention can be had by reference to the following illustrative examples.

EXAMPLES

A polymeric blend for the core layer 15 was prepared in accordance with the following recipe.

CORE BLEND RECIPE

| Commercial Name | CAS # | Common Name | Parts by Weight |
|---|---|---|---|
| PVC 1066 | 9002-86-2 | Poly(vinyl-chloride) | 100 |
| VC 168 | 9003-22-9 | PVC suspension copolymer vinyl chloride-vinyl ester resin | 100 |
| Blendex 338 | — | ABS Copolymer | 20 |
| ELVALOY ® 4924 | 26337-35-9 | Poly(ethylene/vinyl acetate/CO) | 13.33 |
| ELVALOY ® 441 | — | Ethyl Acrylate | 2.67 |
| K-130 | — | Acrylic Copolymer | .67 |
| Prosper M36 | 76-06-8 | Butyltin mercaptide carboxylate | 2.67 |
| Mark 2255 | — | Butyltin mercapto carboxylate | 2.0 |
| Loxiol 7111 | — | Mixed glycerol esters | 0.8 |
| Loxiol G70 | — | Polymeric complex ester | .2 |
| AC 629A | 68441-17-8 | Oxidized polyethylene | 1.33 |
| Mark C | — | Tertiary organo phosphite | 0.67 |

The preparation of a plastic sheet from the above core blend recipe was as follows: The PVC and the vinyl chloride-vinyl acetate resins were conveyed to a holding hopper located above a Banbury mixer. These resins are then metered into the hopper in the proper amounts as required by the recipe. The weighed resins were then dropped into the Banbury mixer. The additional core blend ingredients were then each weighted individually in sequence in a batch tub and then dumped into the Banbury. The core blend was then mixed and fluxed into a batch of plastic. At the proper temperature (275°–340° F., 135°–171° C.) the batch of properly fluxed core plastic was dropped out of the Banbury into a conveying hopper and conveyed to a two roll dump mill. At the dump mill additional mixing was conducted (if required). The core plastic was then strip conveyed to a feed mill. The feed mill was used for some additional fluxing and to enable a continuous feed strip to be fed into a calender. The calender had four metal rolls in the configuration of an inverted "L" at surface temperatures of from about 310° F. (154° C.) to about 340° F. (171° C.). The metal rolls formed the fluxed core plastic into a continuous web that when stripped from the bottom calender roll had the required thickness, width and surface. The core plastic was then cooled into a flat web that was cut into suitable sized sheets.

An alternative core layer blend has the following recipe.

ALTERNATIVE CORE BLEND RECIPE

| MATERIAL | PARTS BY WEIGHT | COMMON NAME |
|---|---|---|
| GEON 334 | 100 | PVC Homopolymer |
| GEON 426 (High I.V.) | 50 | PVC Homopolymer |
| Rohm & Haas K 130 | 7 | Process Aid (Acrylic Copolymer) |
| ELVALOY ® 441 | 2 | Ethylene Acrylate |
| ELVALOY ® 4924 | 10 | Copolymer, poly(ethylene/vinyl acetate/carbon monoxide) |

-continued

ALTERNATIVE CORE BLEND RECIPE

| MATERIAL | PARTS BY WEIGHT | COMMON NAME |
|---|---|---|
| Rohm & Haas BTA 702 | 15 | MBS Copolymer |
| Baerlocher Prosper M 36 | 2.5 | Butyltin Mercaptan Carboxylate |
| WITCO (Argus) Mark 2255 | 2 | Butyltin Mercapto Carboxylate |
| Loxiol 7111 | 1.25 | Mixed Glycerol Esters |
| Loxiol G70 | .45 | Polymeric Complex Ester |
| AC629A | .15 | Oxidized Polyethylene |
| Martinal OL107 | 5 | Alumina Trihydrate |

The preparation of a plastic sheet from the alternative core blend recipe can be prepared in the same manner as set forth hereinabove. The first core recipe is generally utilized when a magnetic strip is utilized on a credit card whereas the alternative core blend receipt is utilized in association with a microchip.

A polymeric overlay blend for outer layer 20 was prepared in accordance with the following recipe.

OVERLAY BLEND RECIPE

| Commercial Name | CAS # | Common Name | Parts by Weight |
|---|---|---|---|
| PVC 1066 | 9002-86-2 | Poly(vinyl chloride) | 100 |
| VC 168 | 9003-22-9 | PVC suspension copolymer resin | 20 |
| ELVALOY ® 4924 | 26337-35-9 | Poly(Ethylene/vinyl-acetate/carbon monoxide | 22 |
| Blendex 338 | — | ABS Copolymer | 16 |
| ELVALOY ® 441 | — | Ethyl Acrylate | 2 |
| K-130 | — | Acrylic polymer | 1 |
| T-31/PA1076 | 10584-96-2 | Dibutyltin Bis (2-ethylhexylmercapto-acetate) | 6.8 |
| Loxiol 7111 | — | Mixed Glycerol Esters | 1.4 |
| Loxiol G70 | — | Polymeric Complex Esters | .5 |
| AC 629A | 68441-17-8 | Oxidized Polyethylene Esters | .18 |
| Mark C | — | Tertiary Organo Phosphites | — |
| Tinuvin 328 | 25973-55-1 | 2-(2'-Hydroxy-3',5' Di-teramylphenyl) benzotriazole | .48 |

The above ingredients in the indicated amounts were added to a Henschel mixer and mixed at 70° to 120° F. (21° to 49° C.) for 2 minutes, until all ingredients were blended. The resulting powder blend was dumped out of the Henschel mixer into a holding hopper. The overlay powder blend was then metered into a Farrell continuous mixer and fluxed. The fluxed plastic was cut into pieces and then conveyed to two-rolled mill having a surface temperature of about 290° F. (143° C.) to about 330° F. (166° C.). The overlay composition was then milled to achieve additional fluxing and to enable a continuous feed strip to be fed to a calender.

Subsequently, the calender overlay material was laminated, cut, and applied to a core layer containing printing indicia thereon. Lamination equipment which was utilized included a top and bottom press platens and a top and bottom chrome polish plates. The heating press platens were both heated to approximately 290° F. (143° C.). A core-overlay utilizing sheets made in a manner as noted above was plied in a configuration as set forth in FIG. 1. The core with overlay sheets on each side thereof was placed between the two high polished chrome plates and a hydraulic pressure of approximately 5 tons applied for approximately 3 minutes to allow proper lamination of each overlay to the core plastic. The press was then opened for a short period of time and the laminate rapidly transferred to cooling press platens, i.e., two opposed press platens and also two opposed polish plates at a temperature of approximately 100° F. (38° C.). The cooling platens were closed and a hydraulic pressure of approximately 7 tons applied for about 3 minutes. The cooling press platens were then opened and the laminate removed. The resulting laminate was then die cut into standard size credit cards for flex life and other testing.

Laminates were made in the above manner utilizing as a core the alternative Core Blend Recipe and laminated with an Overlay Blend Recipe as set forth herein. The thickness of the core layer was two 13.5 mil layers laminated together (total thickness 27 mils) and a 3 mil overlay on each surface of the core layer for a total laminate thickness of 33 mils. One such laminate was embossed while the other was not. They were then tested in A.D. Little flex tester at 70 cycles per minute. The results thereof are set forth in Table I. As a control, a laminate was made wherein the core material was a Comparative Core Recipe A having a total thickness of 26.5 mils and an overlay material (a modified PVC) obtained from American Hoechst which was 1.8 mils. The overlay was attached to each side of the core layer. The results of the control and a laminate made from the present invention test until 90% breakage are set forth in Table I, wherein the flex life represents the number of flexes until a fracture failure of 90% of the card length occurs.

TABLE I

| | Embossed | | Unembossed | |
|---|---|---|---|---|
| Flex Life | Control | Invention | Control | Invention |
| Transverse Direction | 2,500 | 3,100 | 4,000 | 6,000 |
| Machine Direction | 3,300 | 19,500 | 7,000 | 46,000 |

As apparent from Table I, dramatic increases in flex life was obtained, especially in the machine direction utilizing core and laminate recipes of the present invention.

The A.D. Little flex tester had a fixed jaw and a moving jaw. The moving jaw cycles (back and forth) at the rate of 30±2 cycles per minute. The cross section of each jaw was generally rectangular and contained a V-shaped opening therein. One leg of the V was horizontal while the other was at an acute angle of about 45°. The horizontal distance (i.e., back and forth) of the movable jaw was 0.275±0.005 inches which resulted in a card flex height, that is, from a horizontal position to an upward curve position, of about 0.79 inches. Flex life is the number of flexes until approximately a ½" fracture occurs.

Generally, laminates of the present invention which are suitable for credit cards generally have an unembossed flex life of at least 10,000, or 15,000, desirably at least 20,000, and preferably at least 25,000 and even 30,000 flexes in the machine direction with an overall range of from generally about 6,000 or 8,000 to about 50,000 flexes. The normal credit card life is thus estimated to be from about 3 to about 5 years.

While in accordance with the Patent Statutes, the best mode and preferred embodiment has been set forth, the scope of the invention is not limited thereto, but rather by the scope of the attached claims.

What is claimed is:

1. A laminate, comprising;

at least one overlayer bound to a core layer, wherein said core layer contains pigments or colorants or both and has indicia thereon, said core layer comprising a blend of (a) a polyvinyl chloride or a copolymer thereof containing up to 30 percent by weight of another halogen-containing repeat unit, (b) a copolymer derived from vinyl chloride and vinyl ester monomers (c) from about 10 to about 80 parts by weight per 100 parts by weight of said polyvinyl chloride polymer or said halogen copolymer thereof of at least one acrylic resin polymer or copolymer or combination thereof, and (d) a low melting point copolymer derived from ethylene monomers, vinyl ester monomers wherein the ester portion has from 2 to 6 carbon atoms, and carbon monoxide monomers, and wherein said overlayer comprises a substantially transparent layer.

2. A laminate according to claim 1, wherein said substantially transparent overlayer comprises a blend of (a) polyvinyl chloride or a copolymer thereof containing up to 30 percent by weight of another halogen-containing repeat unit, (b) a copolymer derived from vinyl chloride and vinyl ester monomers (c) at least one acrylic resin polymer or copolymer or combinations thereof, and (d) a low melting point copolymer derived from ethylene monomers, vinyl ester monomers wherein the ester portion has from 2 to 6 carbon atoms, and carbon monoxide monomers.

3. A laminate according to claim 2, wherein said vinyl ester of said low melting point copolymer of said core layer and said overlayer is vinyl acetate, wherein in said core layer the amount of said low melting point copolymer is from about 5 parts to about 50 parts by weight based upon 100 parts by weight of said polyvinyl chloride or said halogen copolymer thereof, wherein in said overlayer the amount of said low melting point copolymer is from about 5 to about 40 parts by weight based upon 100 parts by weight of said polyvinyl chloride or said halogen copolymer thereof, and wherein in said core layer and said overlayer the amount of repeat units in said low melting point copolymer derived from said vinyl acetate is from about 10 to about 45 percent by weight, wherein the amount of said repeat units derived from carbon monoxide is from about 3 to about 30 percent by weight, and wherein the amount of said repeat units derived from ethylene is the remainder.

4. A laminate according to claim 3, wherein in said core layer the amount of said vinyl chloride-vinyl ester copolymer is from about 50 to about 200 parts by weight per 100 parts by weight of said polyvinyl chloride or said halogen copolymer thereof, wherein in said core layer the amount of said at least one acrylic resin polymer, or copolymer, or combination thereof, is from about 12 to about 60 parts by weight per 100 parts by weight of said polyvinyl chloride or said halogen copolymer thereof, wherein in said overlayer the amount of said vinyl chloride-vinyl ester copolymer is from about 10 to about 250 parts by weight per 100 parts by weight of said polyvinyl or said halogen copolymer thereof, and wherein in said overlayer the amount of said at least one acrylic resin polymer, or copolymer, or combination thereof, is from about 0.5 to about 20 parts by weight per 100 parts by weight of said polyvinyl chloride or said halogen copolymer thereof.

5. A laminate according to claim 4, wherein the laminate is an identification card, and wherein said core layer is laminated to said overlayer at a temperature of less than 320° F.

6. A laminate according to claim 4, wherein in said core layer the amount of said vinyl chloride-vinyl ester copolymer is from about 75 to about 125 parts by weight and wherein the amount of said at least one acrylic resin polymer, or copolymer, or combination thereof, is from about 15 to about 40 parts by weight, and wherein in said overlayer the amount of said vinyl chloride-vinyl ester copolymer is from about 15 to about 200 parts by weight and wherein the amount of said at least one acrylic resin polymer, or copolymer, or combination thereof, is from about 1 to about 10 parts by weight.

7. A laminate according to claim 1, wherein said vinyl ester of said low melting point copolymer is vinyl acetate, wherein the amount of said low melting point copolymer is from about 5 parts to about 50 parts by weight based upon 100 parts by weight of said polyvinyl chloride or said halogen copolymer thereof, wherein the amount of repeat units in said low melting point copolymer derived from said vinyl acetate is from about 5 to about 60 percent by weight, wherein the amount of said repeat units derived from carbon monoxide is from about 3 to about 30 percent by weight, and wherein the amount of said repeat units derived from ethylene is the remainder, and wherein said transparent overlayer comprises a copolymer of vinyl chloride and vinyl ester, a polyester, or a fluoride containing polymer, or combinations thereof.

8. A laminate according to claim 7, wherein said overlayer comprises said fluoride containing polymer.

9. A laminate according to claim 8, wherein in said low melting point copolymer the amount of repeat units derived from vinyl acetate is from about 20 to about 28 percent by weight, wherein the amount of repeat units derived from carbon monoxide is from about 3 to about 20 percent by weight, and wherein repeat units derived from ethylene is the remainder, wherein said melting point of said low melting point copolymer is from about 110° F. to about 160° F.

10. A laminate according to claim 7, wherein the laminate is an identification card.

11. A laminate according to claim 7, wherein in said core layer the amount of said vinyl chloride-vinyl ester copolymer is from about 50 to about 200 parts by weight per 100 parts by weight of said polyvinyl chloride or said halogen copolymer thereof, and wherein in said core layer the amount of said at least one acrylic resin polymer, or copolymer, or combination thereof, is from about 12 to about 60 parts by weight per 100 parts by weight of said polyvinyl chloride or said halogen copolymer thereof.

12. A laminate according to claim 11, wherein the laminate is an identification card, and wherein said core layer is laminated to said overlayer at a temperature of less than 320° F.

13. A laminate according to claim 11, wherein in said core layer the amount of said vinyl chloride-vinyl ester copolymer is from about 75 to about 125 parts by weight and wherein the amount of said at least one acrylic resin polymer, or copolymer, or combination thereof, is from about 15 to about 40 parts by weight.

14. A laminate according to claim 2, wherein the laminate is an identification card.

* * * * *